United States Patent [19]
Yui

[11] Patent Number: 5,910,998
[45] Date of Patent: Jun. 8, 1999

[54] MAIL PROCESSING SYSTEM

[75] Inventor: Hideto Yui, Yokohama, Japan

[73] Assignee: Kabushiki Kaisha Toshiba, Kawasaki, Japan

[21] Appl. No.: 08/685,858

[22] Filed: Jul. 24, 1996

[30] Foreign Application Priority Data

Jul. 24, 1995 [JP] Japan ................................. 7-187311

[51] Int. Cl.⁶ .................................................. G06K 9/00
[52] U.S. Cl. .......................... 382/101; 209/900; 209/584; 364/478.14; 364/478.15
[58] Field of Search ................................... 382/101, 102, 382/311; 209/900, 584; 364/478.14, 478.15; 380/51, 28; 705/401

[56] References Cited

U.S. PATENT DOCUMENTS

| | | | |
|---|---|---|---|
| 4,921,107 | 5/1990 | Hofer | 209/546 |
| 4,965,829 | 10/1990 | Lemelson | 382/101 |
| 5,317,654 | 5/1994 | Perry et al. | 382/102 |
| 5,455,875 | 10/1995 | Chevion et al. | 382/311 |

FOREIGN PATENT DOCUMENTS

| | | |
|---|---|---|
| 0 148 487 | 7/1985 | European Pat. Off. . |
| 0148487 | 7/1985 | European Pat. Off. . |
| 0 589 119 | 3/1994 | European Pat. Off. . |
| 0 635 314 | 1/1995 | European Pat. Off. . |
| 0589119 | 3/1996 | European Pat. Off. . |
| 64-14682 | 1/1989 | Japan . |

Primary Examiner—Andrew W. Johns
Assistant Examiner—Hieu C. Le
Attorney, Agent, or Firm—Pillsbury Madison & Sutro LLP

[57] ABSTRACT

The image data of the mail, which has not been recognized by a read/sort apparatus, and the address writing form thereof are transmitted to an image distribution section of a video coding system. A control section of the video coding system sends the image data received by the image distribution section to one of video coding disks in accordance with the address writing form. Thus, images of the mails having the same address writing form are displayed on a display section of the same video coding disk. Viewing the display section, an operator input address information from an input section to correct the address of the mail. A collation section confirms whether the corrected address exists or not with reference to an address information storage section.

8 Claims, 15 Drawing Sheets

EXAMPLE OF ITEMS OF
REJECT INFORMATION

| WRITING FORM (PRINTING/HANDWRITING, VERTICAL WRITING/HORIZONTAL WRITING) | RECOGNITION RESULT OF RECOGNITION | OTHERS (MAIL SIZE ETC.) |
|---|---|---|

F I G. 4

| PRINTING/ HANDWRITING | VERTICAL WRITING/ HORIZONTAL WRITING | OLD ADDRESS /NEW ADDRESS | CODING STATION |
|---|---|---|---|
| 0 | 0 | 0 | 25a |
| 0 | 0 | 1 | 25b |
| 0 | 1 | 0 | 25c |
| 0 | 1 | 1 | 25d |
| 1 | 0 | 0 | 25e |
| 1 | 0 | 1 | 25f |
| 1 | 1 | 0 | 25g |
| 1 | 1 | 1 | 25h |

F I G. 5

EXAMPLE OF FIRST CODE INFORMATION

| POSTAL CODE NUMBER | TOWN NAME CODE | ADDRESS INDICATION NUMBER, ETC. |
|---|---|---|

FIG. 6

EXAMPLE OF DATABASE STRUCTURE OF ADDRESS INFORMATION STORAGE SECTION

| OLD AND NEW ADDRESS INDICATION FLAG | POSTAL CODE NUMBER | TOWN NAME CODE | BLOCK NUMBER | STREET NUMBER | HOUSE NUMBER | APARTMENT HOUSE NUMBER /ROOM NUMBER | SHOP NAME |
|---|---|---|---|---|---|---|---|

FIG. 7

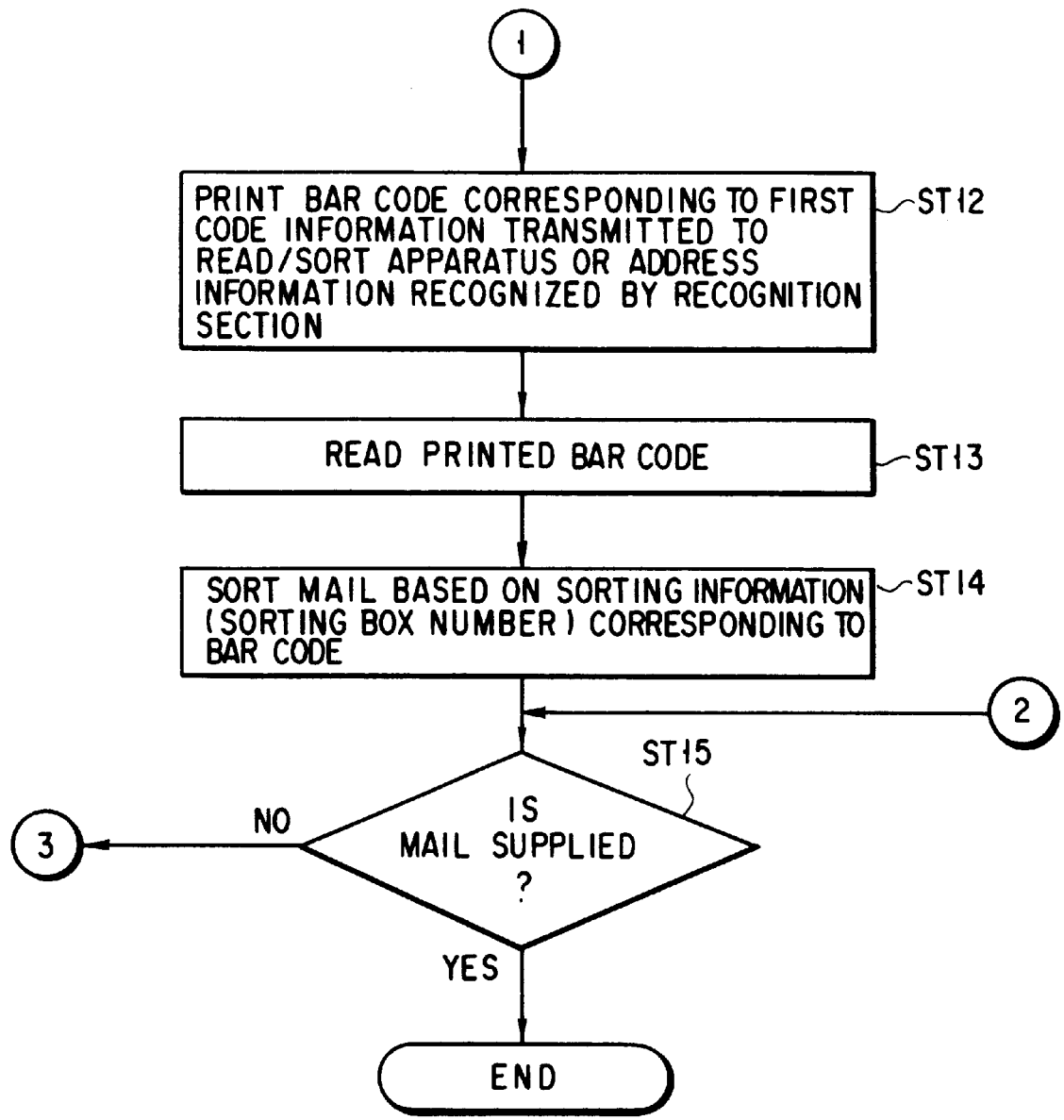
F I G. 8B

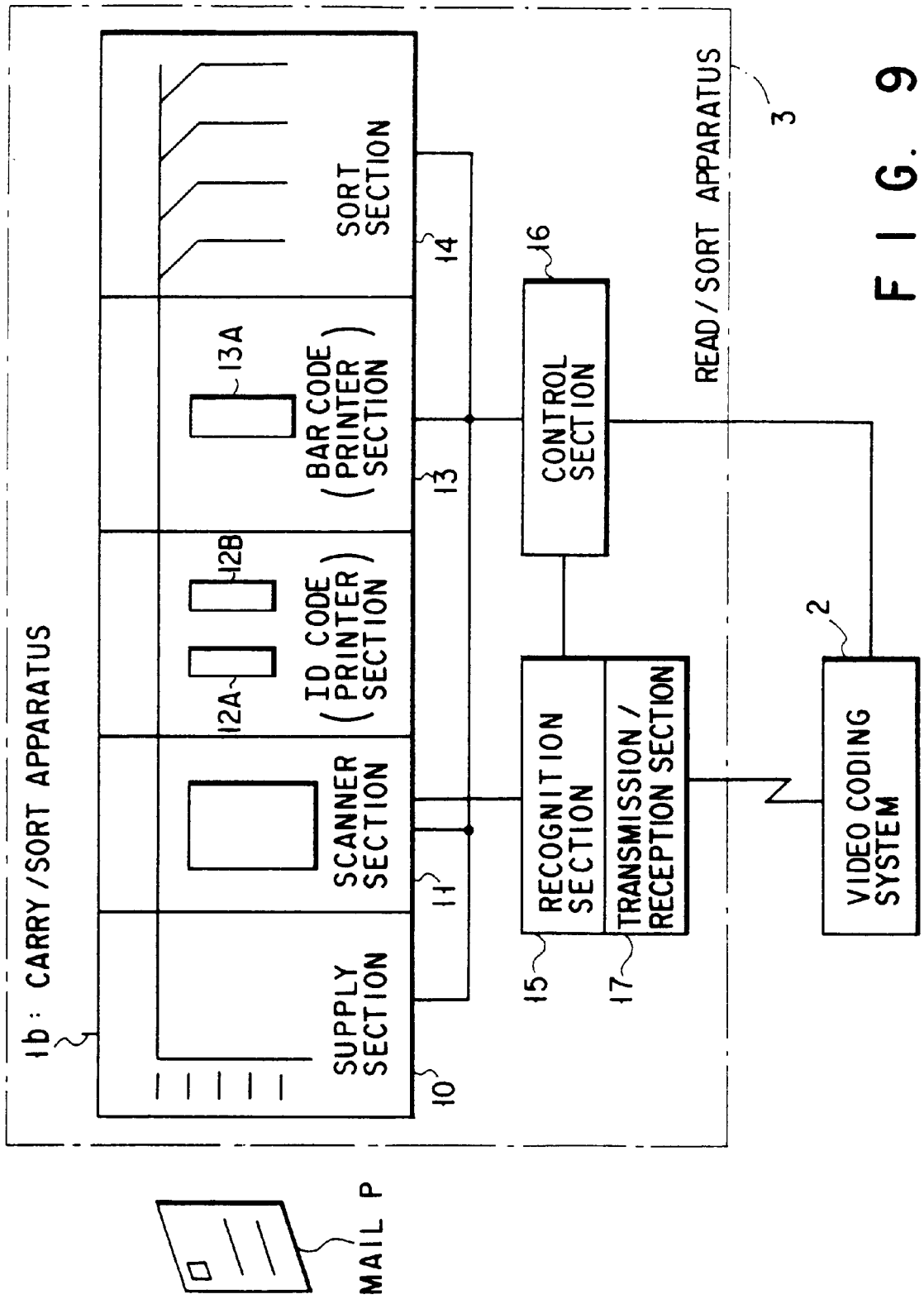
F I G. 9

EXAMPLE OF ID CODE

| DATE AND TIME INFORMATION | POST OFFICE NAME | MACHINE NUMBER | MAIL NUMBER |

F I G. 10

EXAMPLE OF ITEMS OF SECOND CODE INFORMATION

| DATE AND TIME INFORMATION | POST OFFICE NAME | MACHINE NUMBER | MAIL NUMBER | POSTAL CODE NUMBER | TOWN NAME CODE | ADDRESS INDICATION NUMBER ETC. |

F I G. 13

MAIL PROCESSING SYSTEM

BACKGROUND OF THE INVENTION

1. Field of the Invention

The present invention relates to a mail processing system wherein address information is read from the mail and, sorting information is generated according to the read address information. The mail is then sorted by the sorting information more specifically, the invention relates to a mail processing system wherein an operator inputs a mail address, which has not been read, while viewing the entire image of the mail displayed by a video coding terminal, and the mail is thus sorted by the sorting information corresponding to the input address.

2. Description of the Related Art

A video coding system (VCS) serving as both a mail processing apparatus and a video coding terminal has recently been developed. In this type of system, information is read from the mail by an optical character reading device, and the mail is sorted by postal code number, delivery zone, etc. in accordance with sorting information corresponding to the read information.

When the address information of the mail cannot be read, the total image of the mail is displayed on a display section of the video coding terminal. An operator views the display section and inputs the address information (coding processing) thereby to sort the mail by the sorting information corresponding to the address information. The limitation of mechanical sorting by the optical character reading device can thus be compensated.

In the foregoing prior art video coding system, an operator inputs address information using a keyboard or the like while viewing images of the mails which are displayed in order of supply. When addresses are written illegibly, uniquely, or are complicated and difficult to decipher (printing or handwriting, vertical writing or horizontal writing, new address or old address, etc.), an operator's input operation is less efficient and the likelihood error increases.

SUMMARY OF THE INVENTION

It is an object of the present invention to provide a mail processing system which allows an operator to code address information with high efficiency and prevents the operator from inputting incorrect address information.

In order to achieve the above object, according to one aspect of the present invention, a mail processing system for processing mail with address information is provided, comprising: recognition means for recognizing the address information of the mails and providing recognized address information; display means for displaying an image of mail whose address information is not recognized by the recognition means; input means for inputting the address information of the mail based on the image of the mail displayed on the display means; address storage means for storing addresses of an area; collation means for collating the address information input by the input means with the addresses stored in the address storage means, and providing a collation result; and address providing means for providing the address information input by the input means as an address of the mail whose address information is not recognized when the collation result provided by the collation means represents that the address information corresponds to the addresses stored in the address storage means.

With this system, it is confirmed whether the operator's corrected address is true or it is present in the address storage means, thereby preventing the operator from inputting the wrong address by mistake.

According to another aspect of the present invention, a mail processing system for processing mail with address information is provided, comprising: supply means for supplying mail; recognition means for recognizing the address information on the supplied mail, and providing recognized address information; a plurality of correction means for displaying an image of mail whose address information is not recognized by the recognition means, and inputting the address information of the mail whose image is displayed; transfer means for transferring the image of the mail whose address information is not recognized by the recognition means, to a selected one of the plurality of correction means in accordance with partial recognition of the mail; address storage means for storing addresses of an area; collation means for collating the address information input by the plurality of correction means with the addresses stored in the address storage means, and providing a collation result; and address providing means for providing the address information input by the plurality of correction means as an address of the mail whose address information is not recognized when the collation result provided by the collation means represents that the address information corresponds to the addresses stored in the address storage means.

With this system, one of the correction means, or coding stations displays only the writing form, e.g., an image of printed characters only, thereby improving in operator's coding efficiency. In other words, all addresses written vertically are displayed at a specific coding station, and all addresses with printed characters are displayed at a different coding station, etc. Thus the efficiency of the operator performing address correction increases because less time and effort is expended in deciphering and correcting numerous forms of addresses and writing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a view exemplifying items of reject information;

FIG. 5 is a table representing a correlation between reject information and coding disks;

FIG. 6 is a view exemplifying items of first code information;

FIG. 7 is a view showing an example of data structure of an address information storage section;

FIGS. 8A and 8B are views of a flowchart for explaining operation of the mail processing system according to the first embodiment of the present invention;

FIG. 9 is a block diagram showing a read/sort apparatus of a mail processing system according to a second embodiment of the present invention;

FIG. 10 is a view showing items of an ID code;

FIG. 13 is a view exemplifying items of second code information;

DETAILED DESCRIPTION OF THE PREFERRED EMBODIMENTS

Embodiments of the present invention will now be described with reference to the accompanying drawings.

Figure 1:
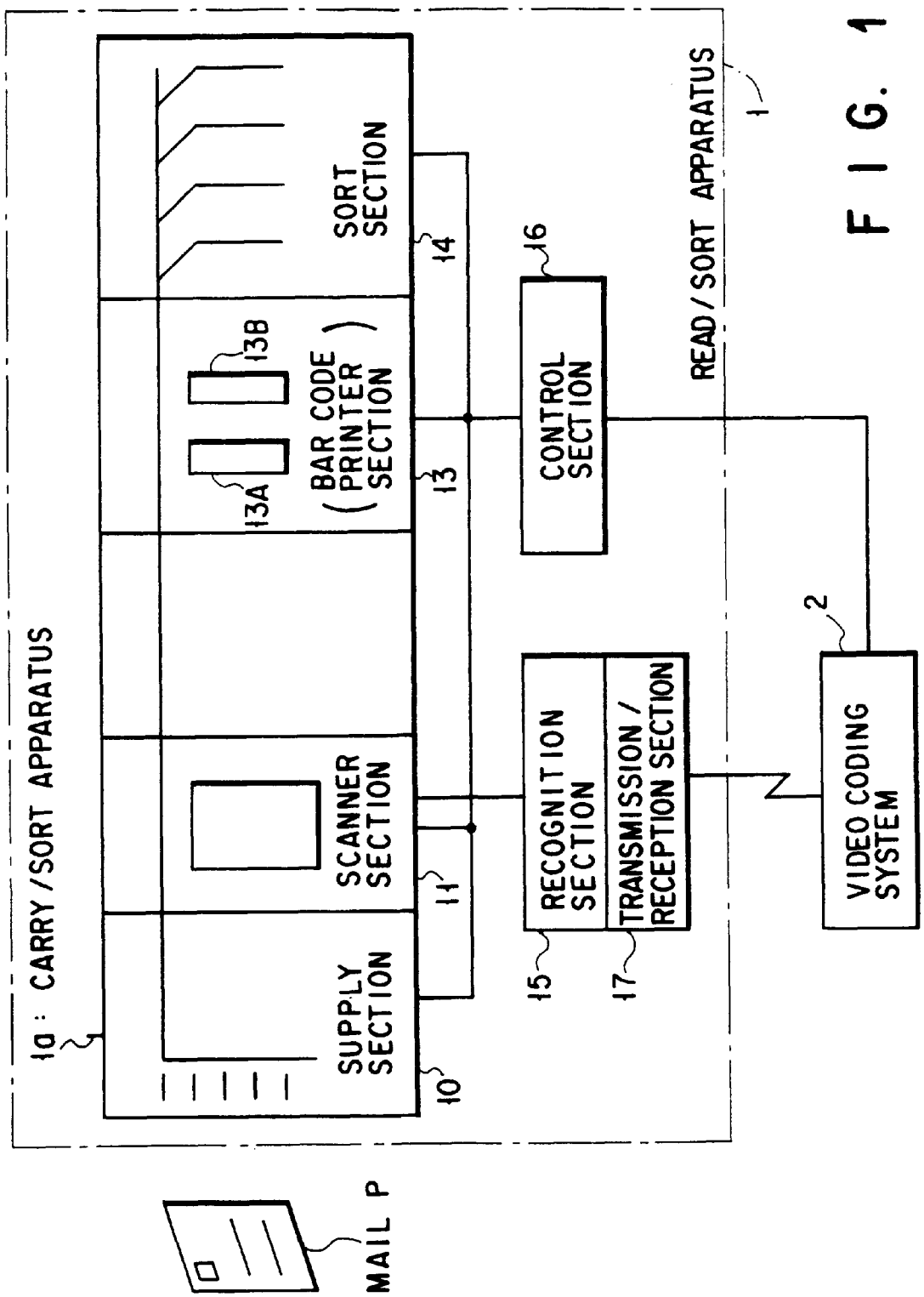
FIG. 1 is a block diagram showing a read/sort apparatus of a mail processing system according to a first embodiment of the present invention.

First, FIG. 1 shows a mail processing system according to a first embodiment of the present invention. This system includes a read/sort apparatus 1 and a video coding system 2.

The read/sort apparatus 1 scans an image on the mail P, recognizes address information from the scanned image, and sorts the mail P by the recognized address information or the address information supplied from the video coding system 2. The mail P is printed with a bar code corresponding to the recognized address information. Generally the bar code can only be read by a bar code reader.

The read/sort apparatus 1 comprises a supply section 10 for supplying the mail P on which characters are handwritten or printed, one by one, a scanner section 11 having a photoelectric converter for scanning the entire image of each piece of mail P supplied by the supply section 10, a recognition section 15 for recognizing address information from the image scanned by the scanner section 11, a transmission/reception section 17 for, when the address information of the mail P is not recognized by the recognition section 15, transmitting a partially recognized result and its corresponding image data of the mail P, to the video coding system 2 and for receiving code information from the system 2, a bar code printer section 13 including a bar code printer 13A for printing the mail P with a bar code corresponding to the address information of the mail P recognized by the recognition section 15 or the address information input by the video coding system 2 and a bar code reader 13B for reading the bar code printed on the mail P, a sort section 14 for sorting the mail P based on the bar code read by the bar code reader 13B and storing the mail P into a predetermined sorting box, and a control section 16 for controlling the respective sections described above.

The supply section 10, scanner section 11, bar code printer section 13, and sort section 14 constitute a carry/sort body 1a.

Figure 2:
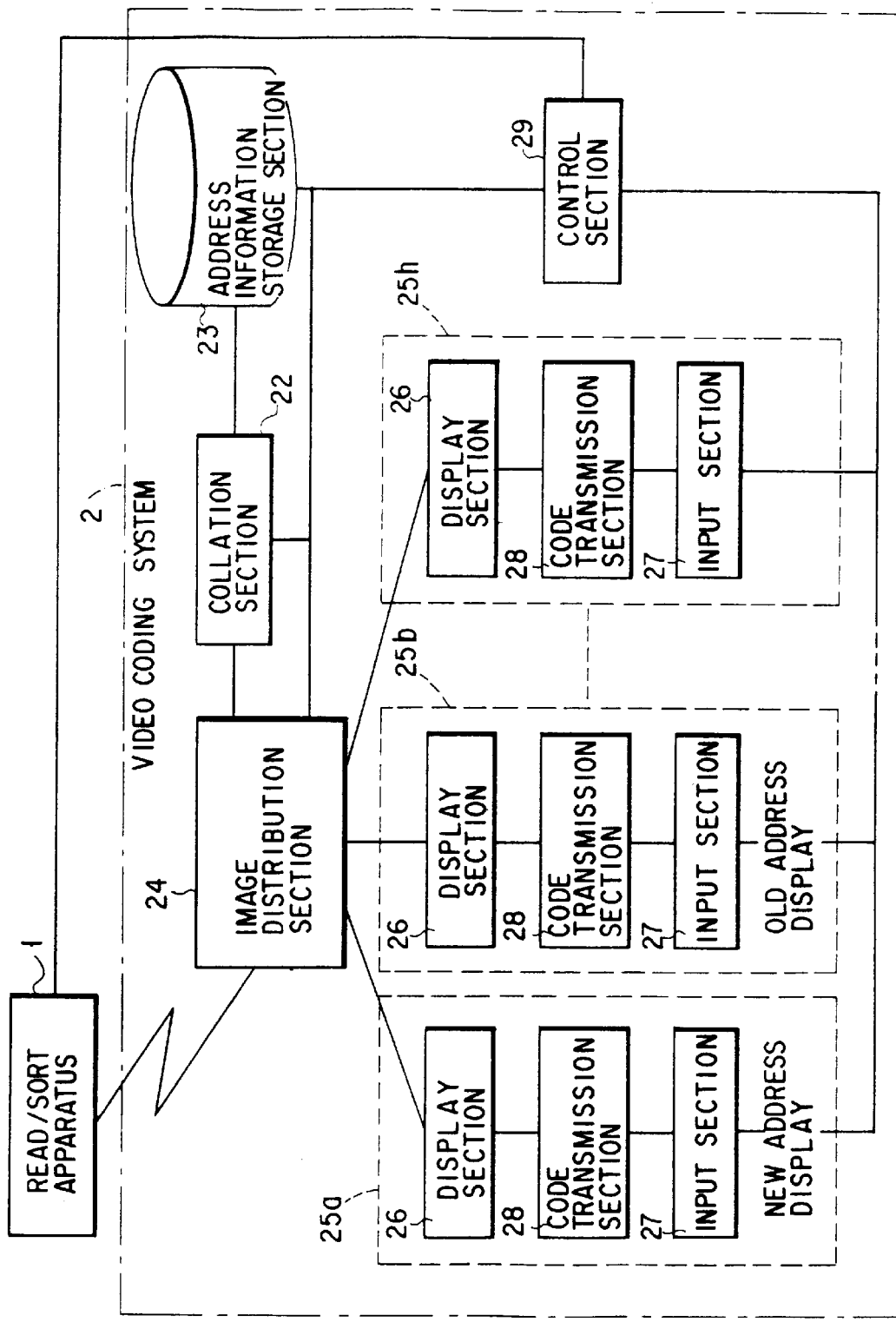
FIG. 2 is a block diagram showing a video coding system of the mail processing system according to the first embodiment of the present invention.

FIG. 2 illustrates the video coding system 2. This system comprises a collation section 22, an address information storage section 23, an image distribution section 24, and coding stations (video coding terminals) 25 (25a to 25h).

Each of the coding stations 25 includes a display section 26, an input section 27 and a transmission section 28.

The address information storage section 23 stores address information (address database) of the whole country using a magnetic disk, an optical disk or the like. The collation section 22 collates the address information stored in the section 23 with that input from the coding desks 25, and provides a collation result. The image distribution section 24 has a function of switching data transfer paths, and the switching is controlled by a control section 29. More specifically, the section 24 supplies the display section 26 with a result (reject information) partially recognized by the recognition section 15 and its corresponding image data of the mail P, sends the address information (first code information) input (or corrected) by an operator to the collation section 22, and transmits a collation result of the collation section 22 to the read/sort apparatus 1. The display section 26 displays an image transmitted from the image distribution section 24. The input section 27 is a keyboard by which the operator inputs the address information while viewing the image displayed on the display section 26. The code transmission section 28 transmits the address information input from the input section 27 to the image distribution section 24. The control section 29 controls the above sections 22 to 25 synthetically, and communicates data with the read/sort apparatus 1.

Figure 3:
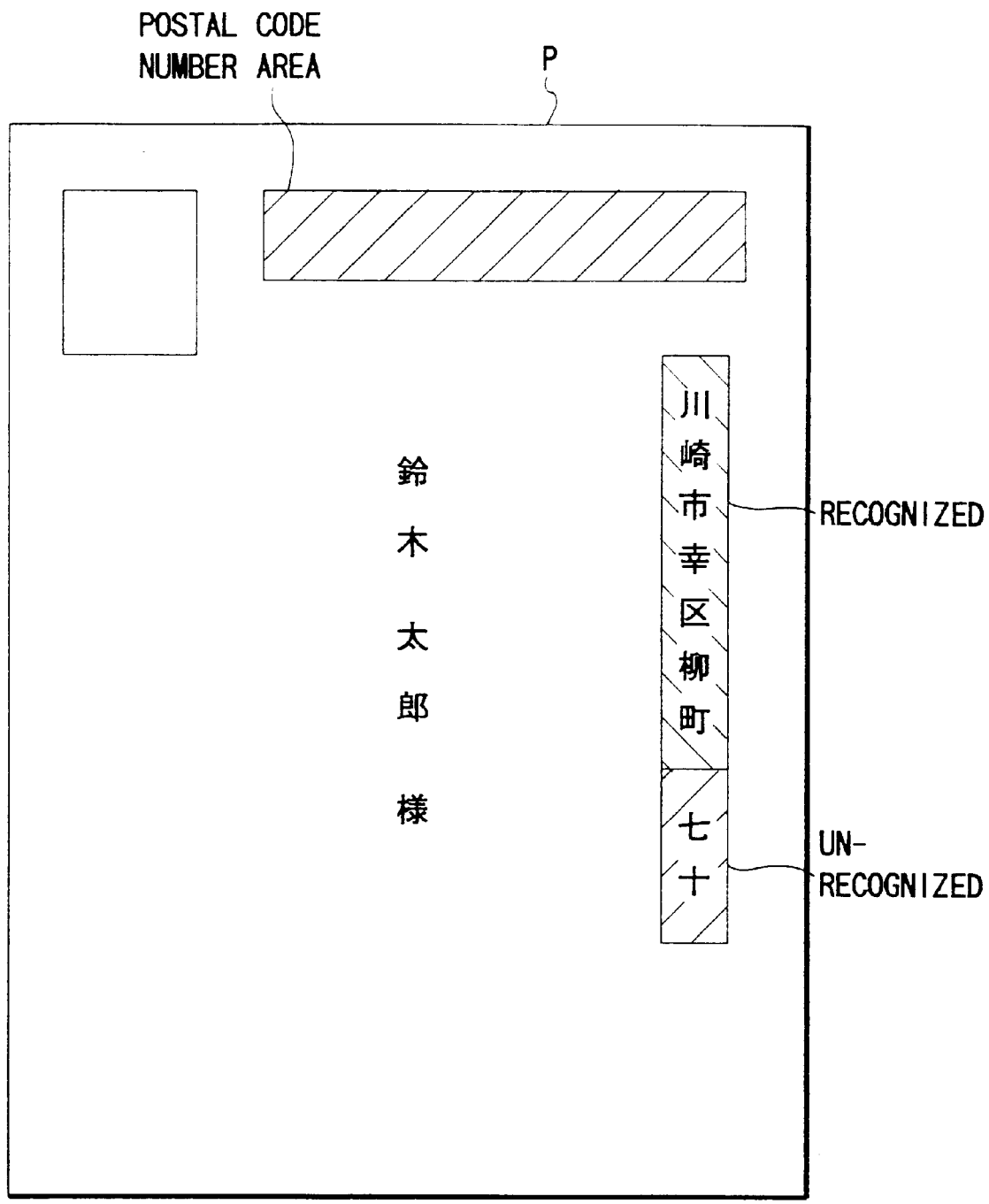
FIG. 3 is a view exemplifying a mail image is unrecognized by the recognition means.

FIG. 3 exemplifies an image of the mail P which was not recognized by the recognition section 15. The mail P includes a postal code number area. In this mail, the address was partially recognized and the number included in the address which is a house number was not recognized.

FIG. 4 exemplifies items of reject information of the mail P which were not recognized (or result partially recognized) by the recognition section 15. The items contain a writing form (printing/handwriting, vertical writing/horizontal writing), a recognition result of the recognition section, and others such as a mail size.

The writing form is data representing whether the mail P is addressed by printed characters or handwritten ones and whether characters are written vertically or horizontally. The discrimination between printed characters and handwritten ones is disclosed in, for example, Jpn. Pat. Appln. No. 62-170198. The recognition result indicates the characters partially recognized by the recognition section 15. The control section 29 transmits the reject information and its corresponding image data to the respective display sections 26 through the image distribution section 24.

The transmission of the image data to the display sections 26 is based on the writing form and the recognition result. The control section 29 determines whether the characters on the mail P are printed or handwritten and whether they are written vertically or horizontally in accordance with the writing form information. Moreover, the control section 29 determines whether an address written on the mail P is new or old in accordance with the recognition result, and transmits an image based on the information.

The control section 29 stores in advance a corresponding table indicative of which video coding station 25 should be used to display an image on its display section 26 in accordance with the reject information. One example of the table is shown in FIG. 5. Assume in this example that the video coding system 2 includes eight coding stations 25a to 25h. If the mail P has characters vertically printed in type and also a new address thereon, an image is displayed on the display section 26 of the specific video coding station 25g. If the mail P has characters horizontally printed in type and also an old address thereon, an image is displayed on the display section 26 of the video coding stations 25f. In this way, an image is displayed on the display section 26 of each of the video coding stations 25 in accordance with eight types of (3-bit) information based on the writing form and the recognition result of the recognition section 15.

Since the image data supplied to the video coding stations 25 have the same format, an operator's input operation can be improved in efficiency. The operator reads the characters, which have not been recognized by the recognition section 15, from the display section 26, and inputs their corresponding address information using a keyboard. The address information input by the operator is sent to the code transmission section 28. FIG. 6 exemplifies items of the first code information transmitted from the code transmission section 28, and the items contain a postal code number, a town name code, and an address indication number.

FIG. 7 shows an example of the database structure of the address information storage section 23. The database structure includes an old and new address indication flag, a postal code number, a town name code, a block number, a street number, a house number, an apartment house number/room number, and a shop name. These data items are all coded.

The collation section 22 collates the first code information with the data stored in the address information storage section 23. When the collation result is true, the first code information is transmitted to the read/sort apparatus 1 through the image distribution section 24. If the collation result is false, another operation, e.g., a key-in operation is performed again.

Figure 8A:
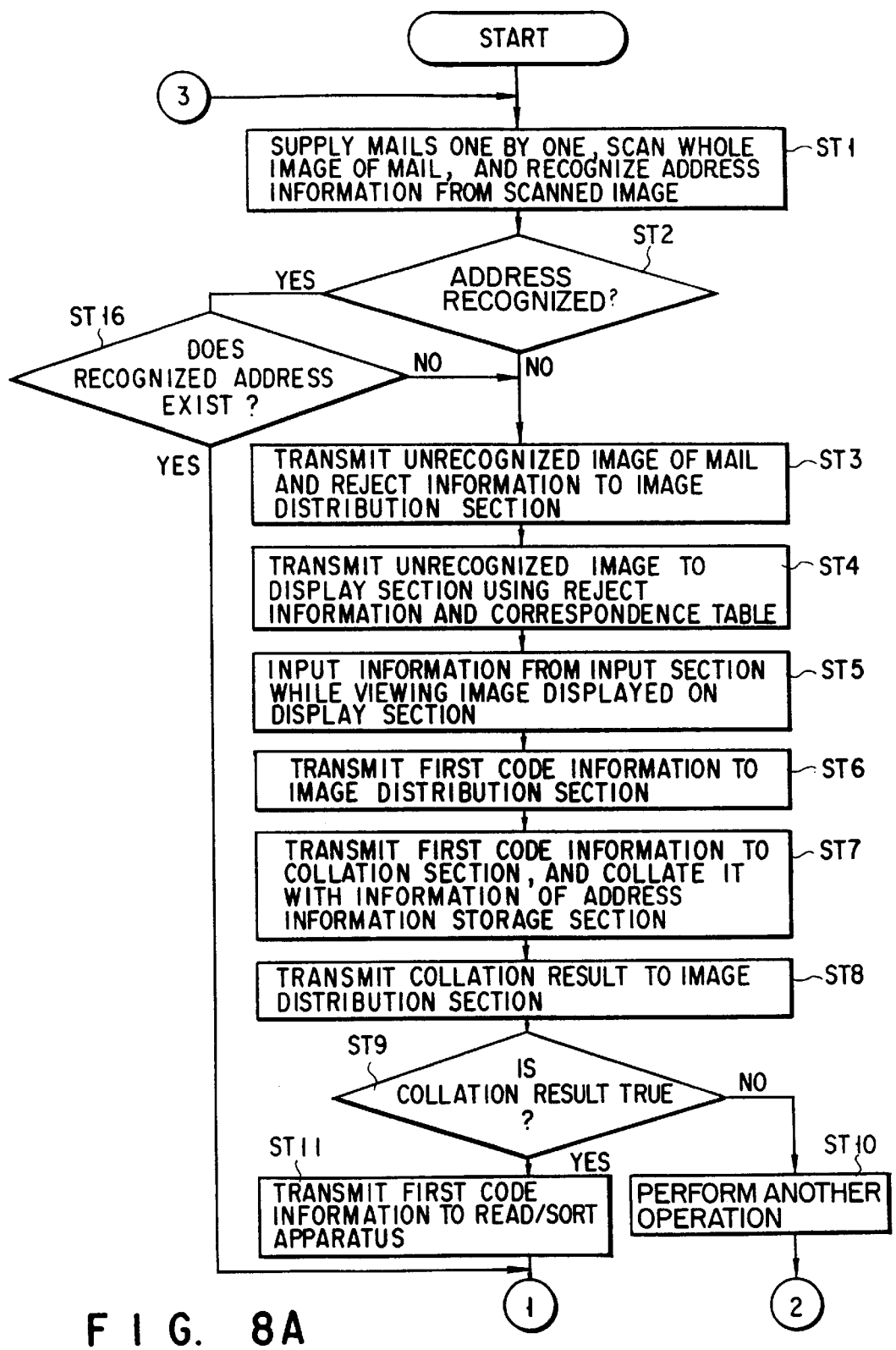

An operation of processing the mail using the above-described system, will now be described with reference to the flowchart shown in FIGS. 8A and 8B.

First the supply section 10 of the read/sort apparatus 1 supplies the mails P one by one, the scanner section 11 thereof scans the whole image of each of the mails P, and the recognition section 15 thereof recognizes address information from the whole image of the mail P scanned by the scanner section 11 (step ST1).

When the address information cannot be recognized by the recognition section 15 (step ST2), the image data and reject information of the mail P are transmitted to the image distribution section 24 of the video coding system 2 via the transmission/reception section 17. (step ST3). If the address information can be recognized by the recognition section 15 (step ST2), the control section 16 confirms whether an address corresponding to the address information recognized by the recognition section 15 exists in an address information storage section, which is not shown but has the same structure as that of the address information storage section 23 (step ST16). Then the flow goes to step ST12. If the address is not present, the flow returns to step ST3.

In step ST4, the image distribution section 24 transmits received image data to one of the display sections 26 of the video coding desks 25. More specifically, as described above, the section 24 transfers image data to one of the eight display sections 26 such that an operator can efficiently input the data using the reject information and the table shown in FIG. 5.

While viewing the image data displayed on the display section 26, the operator inputs the address information from the input section 27 (step ST5). The input information is transmitted as first code information from the code transmission section 28 to the image distribution section 24 (step ST6).

The image distribution section 24 transmits the received first code information to the collation section 22, and the collation section 22 collates the first code information with the address information stored in the address information storage section 23 (step ST7).

The control section 29 sends the collation result to the image distribution section 24 (step ST8). The section 24 transmits the first code information to the read/sort apparatus 1 when the collation result is true (step ST11). When the collation result is false, another operation, e.g., a key-in operation is performed again (step ST10). The true collation result means that the address information input by an operator is present as the actual address, that is, it matches the nationwide address information stored in the address information storage section 23.

When the transmission/reception section 17 receives the first code information from the image distribution section 24, the control section 16 causes the bar code printer 13A of the bar code printer section 13 to print a bar code on the mail P based on the first code information (step ST12). The bar code reader 13B reads the bar code (step ST13), and the sort section 14 sorts the mail P based on the bar code and stores the mail P in a predetermined sorting box (step ST14). If the mail P is supplied further, the flow returns to the step ST1 and, if no mail is supplied, the processing ends (step ST15). The above mail processing can be carried out by the video coding system 2 using only the postal code numbers shown in FIGS. 6 and 7.

FIG. 9 shows a mail processing system according to a second embodiment of the present invention. In FIG. 9, the same elements as those of FIG. 2 are denoted by the same reference numerals and their descriptions are omitted. The system of the second embodiment comprises a read/sort apparatus 3 and a video coding system 4.

The read/sort apparatus 3 differs from the apparatus 1 of the first embodiment in that it has a section for printing an ID code, that is, an ID code printer section 12 for printing an ID code on the mail P when address information is not recognized by the recognition section 15. The mail on which an ID code is printed is stacked in a stacking section (not shown) of the sort section 14 and then resupplied from the supply section 10. FIG. 10 shows items of the ID code which include date and time information, post office name, machine number, and mail number.

If the address information cannot be recognized by the recognition section 15, the transmission/reception section 17 transmits a result partially recognized by the section 15, its corresponding image data of the mail P and its ID code, to the video coding system 4. The transmission/reception section 17 also receives second code information (including ID code) corrected by an operator, from the video coding system 4. A transport/sort body 1b comprises a supply section 10, a scanner section 11, an ID code printer section 12, a bar code printer section 13, and a sort section 14.

Figure 11:
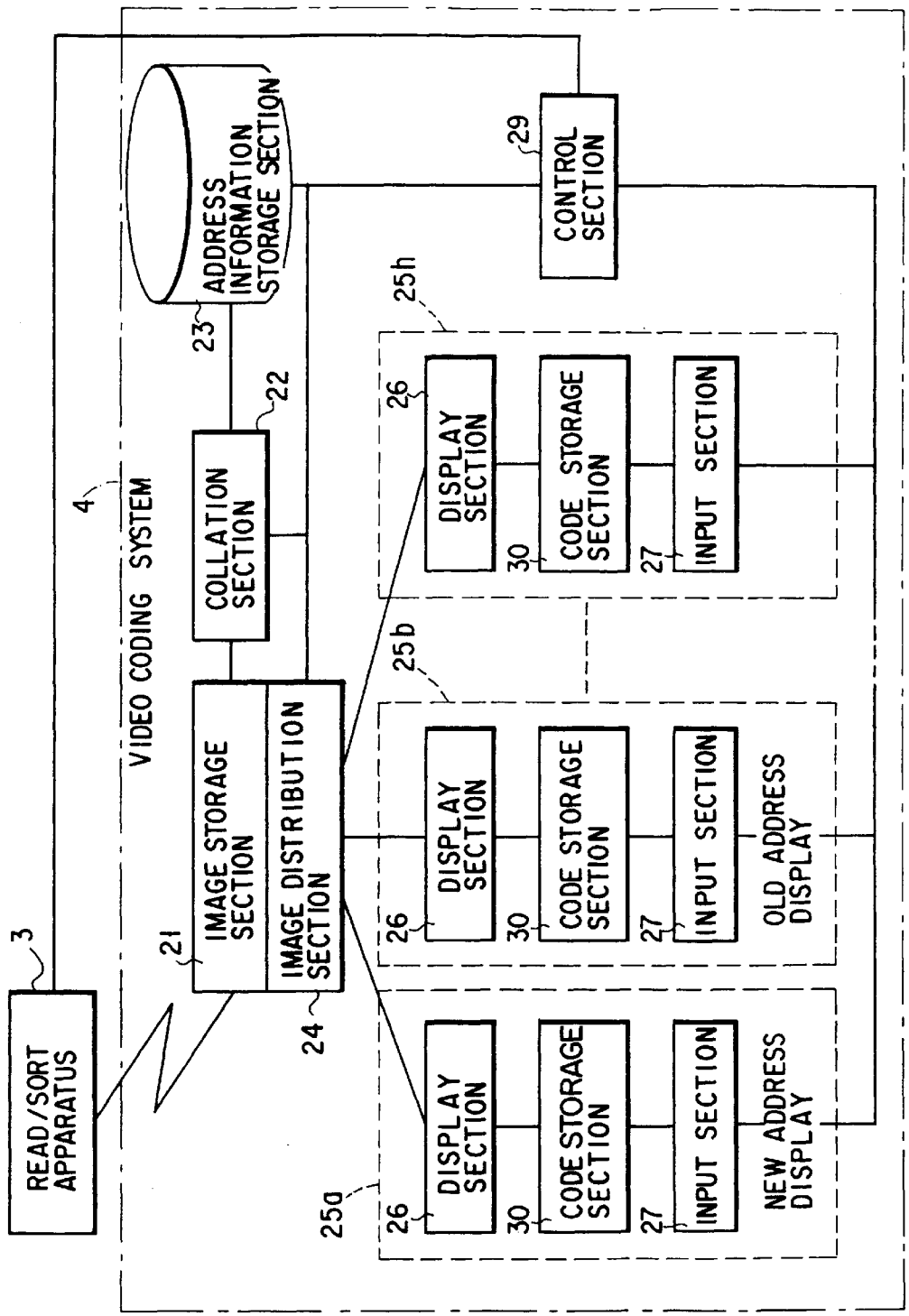
FIG. 11 is a block diagram showing a video coding system of the mail processing system according to the second embodiment of the present invention.

FIG. 11 illustrates the video coding system 4 of the second embodiment. In FIG. 11, the same constituents as those of FIG. 2 are indicated by the same reference numerals and their descriptions are omitted. The system 4 of the second embodiment differs from that shown in FIG. 2 in that it is provided with an image storage section 21 and a code storage section 30.

The image storage section 21 stores address information corresponding to a plurality of ID codes. More specifically, the section 21 stores a plurality of results (reject information) partially recognized by the recognition section 15 of the read/sort apparatus 3 and a plurality of scanned images of the mail P, while causing them to correspond to their respective ID codes. Since the address information is displayed on the display section 26 of the video coding desk 25 and input by an operator, the operator can thus view an image of the mail P longer than in the first embodiment. In other words, since the operator has only to finish inputting the address information before the mail is resupplied, he or she can spend a long time in inputting the information. The image distribution section 24 sends the address information input by the operator to the collation section 22, and the address information is transmitted to the read/sort apparatus 3. The code storage section 30 stores the address information input from the input section 27 as second information corresponding to the ID codes.

Figure 12:
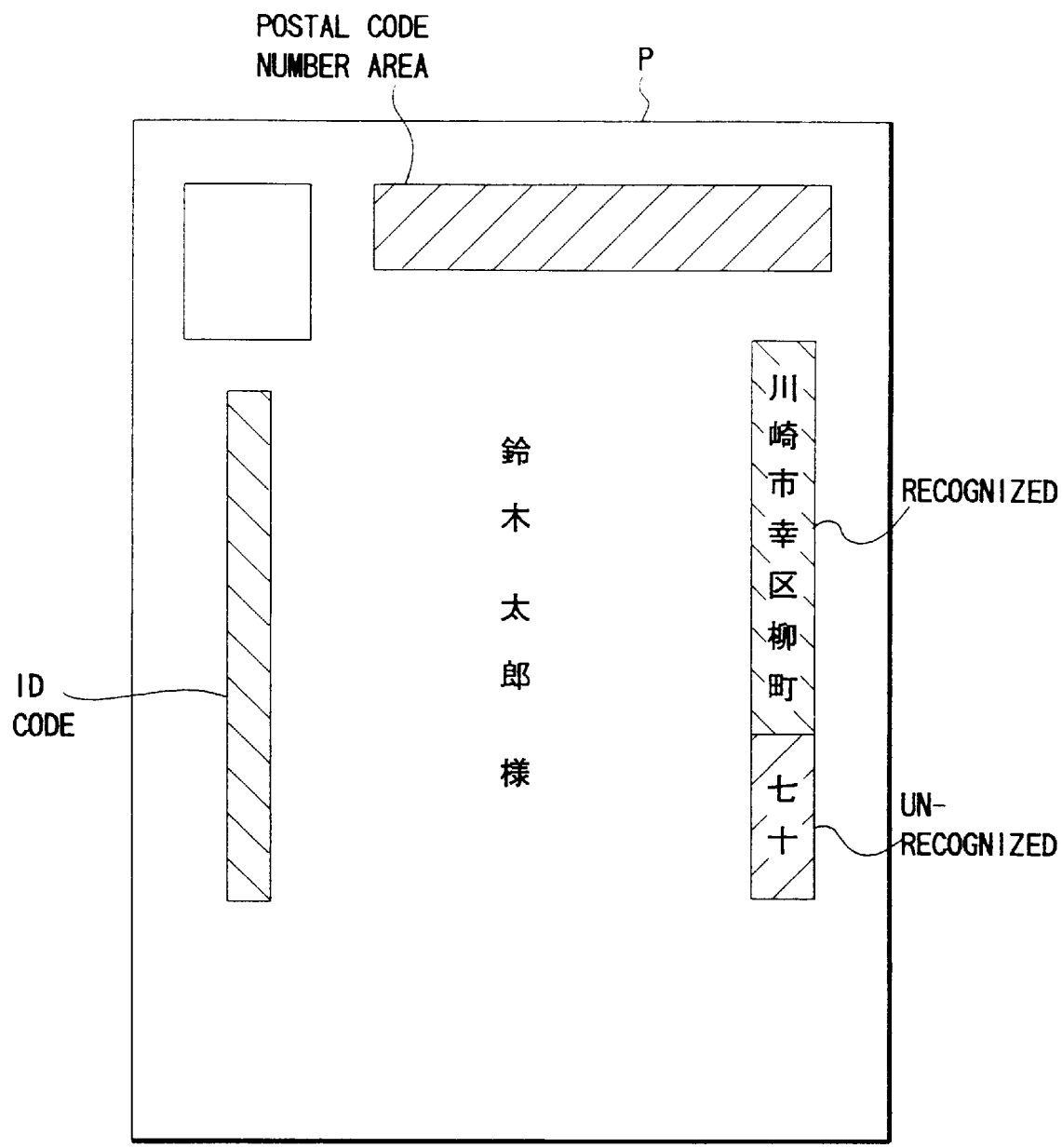
FIG. 12 is a view exemplifying a mail image which has not been recognized by the recognition means.

FIG. 12 illustrates an example of the mail P which was not recognized by the recognition section 15. The mail P includes a postal code number area. In this mail, the address was partially recognized and, in other words, the number "70" included in the address was not recognized. An ID code is printed on the mail P.

FIG. 13 exemplifies items of the second code information (including the ID code). The items contain date and time information, post office name, machine number, mail number, postal code number, town code, and address indication number, etc.

The control section 29 transmits both the image data and ID code to its corresponding display section 26 through the image distribution section 24 using the reject information stored in the image storage section 21 and the corresponding table shown in FIG. 5. Thus, images having substantially the same address writing form, can be transmitted every operation of each coding desk 25, thereby improving in input efficiency.

The control section 29 sends the result obtained from the collation section 22 to the image storage section 21. When the collation result is true, the second code information including the ID code is transmitted to the read/sort apparatus 3, When the collation is false, another operation is performed, e.g., a key-in operation is performed again.

Figure 14A:
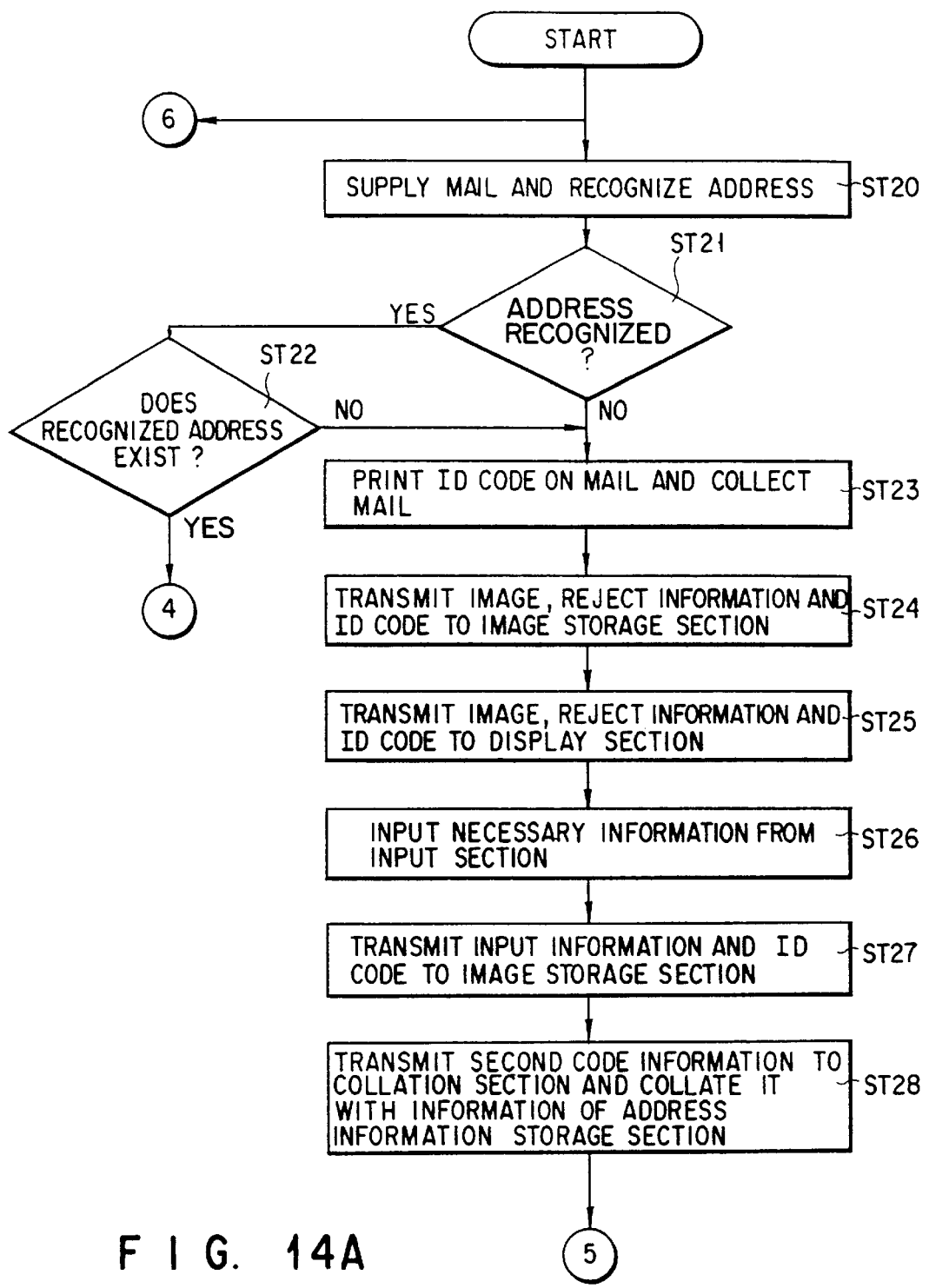
FIGS. 14A and 14B are views of a flowchart for explaining an operation of the mail processing system according to the first embodiment of the present invention.
Figure 14B:
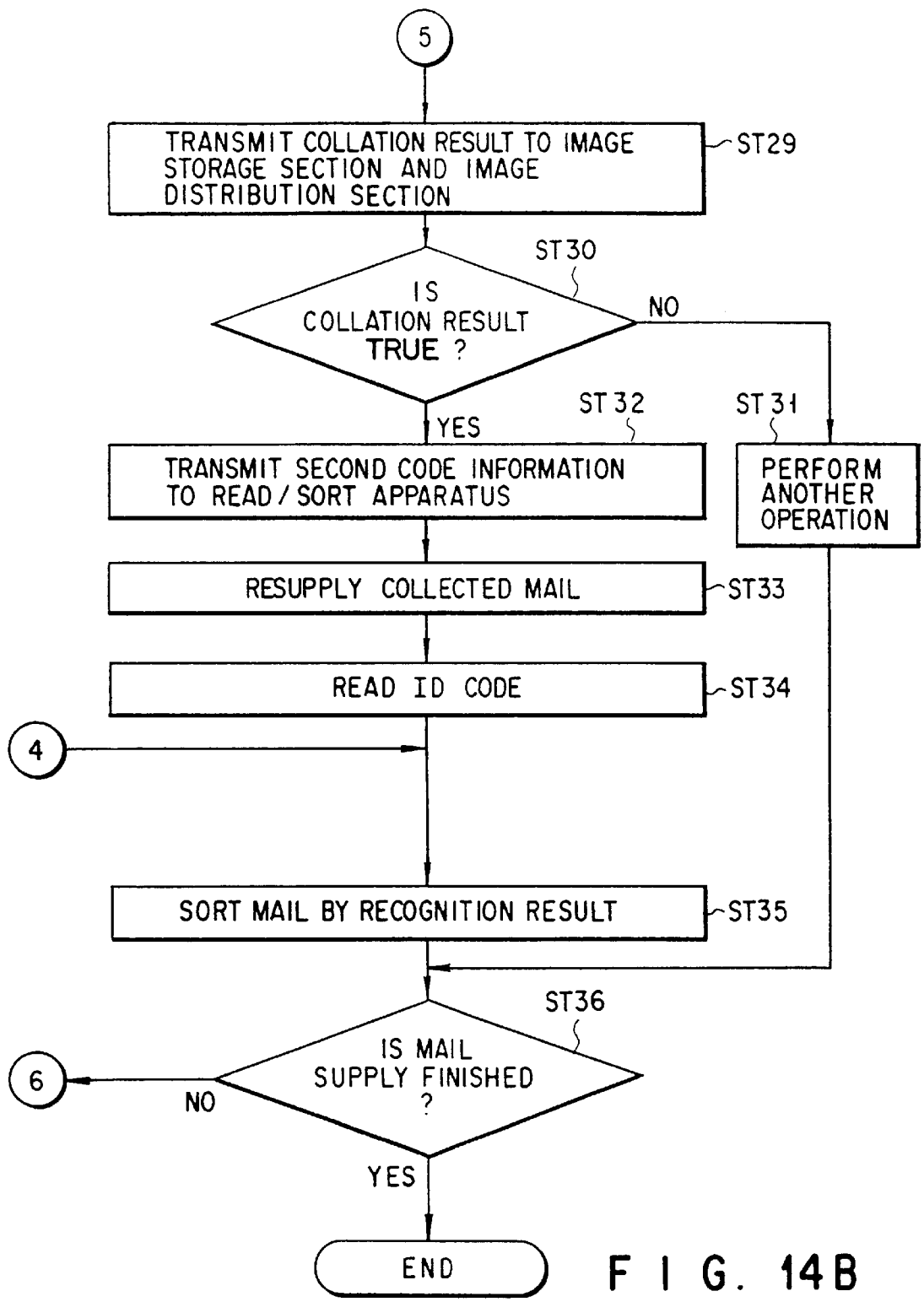

An operation of processing the mail by the above-described system, will now be described with reference to the flowchart shown in FIGS. 14A and 14B.

First the supply section 10 of the read/sort apparatus 3 supplies the mail P one by one, the scanner section 11 scans the entire image of the mails P, the recognition section 15 recognizes address information from the entire image scanned by the scanner section 11 (step ST21). If the address information is recognized by the recognition section 15, the control section 16 confirms whether the address corresponding to the address information is present or not (step ST21). If it is recognized by the section 15, the control section 16 confirms whether the address corresponding to the address information recognized by the recognition section 15 exists in the address information storage section, which is not shown but has the same structure as that of the address information storage section 23 (step ST22), and then the flow goes to the step ST34. If the address is absent, the flow goes to the step ST23.

If the address information of the mail P is not recognized by the recognition section 15 (step ST21), the mail P is printed with an ID code by an ID code printer 12A, and stacked in a stacking section (not shown) of the sort section 14 (step ST23). The image data, reject information and ID code of the mail P are transmitted to the image storage section 21 of the video coding system 4 through the transmission/reception section 17 (step ST24).

The control section 29 of the system 4 transmits the image data and ID code from the image storage section 21 to the display section 26 of the video coding desks 25 using the image distribution section 24 (step ST25). The control section 29 allows the section 24 to distribute the image data using the reject information and the corresponding table shown in FIG. 5 such that the operator can input the address information with efficiency.

The operator inputs the address information through the input section 27 while viewing the image data displayed on the display section 26 (step ST26). The control section 29 stores the input address information in the code storage section 30 as second code information including the ID code, and transmits the second code information to the image storage section 21, the second code information being stored into the section 21 (step ST27). The control section 29 also transfers the second code information stored in the image storage section 21 to the collation section 22, and the collation section 22 collates the received second code information with the address information stored in the address information storage section 23 (step ST28).

The control section 29 transmits the collation result of the collation section 22 to both the image storage section 21 and image distribution section 24 (step ST29). The control section 29 determines whether the collation result is true or false (step ST30) and, if the result is false, performs another operation such as a key-in operation (step ST31).

The operator then resupplies the mail printed with the ID code from the stacking section (step ST32), and reads the ID code by an ID code reader 12B of the ID code printer section 12 (step ST33). The control section 16 searches the image storage section 21 for the second code information including the ID code read by the reader 12B, and prints its corresponding bar code on the mail P using the bar code printer 13A (step ST34). The sort section 14 sorts the mail based on the address information (recognition result) recognized by the recognition section 15 or input result (step ST35). If the next mail P is supplied, the flow returns to the step ST1. If not, the operation ends (step ST36).

Figure 15A:
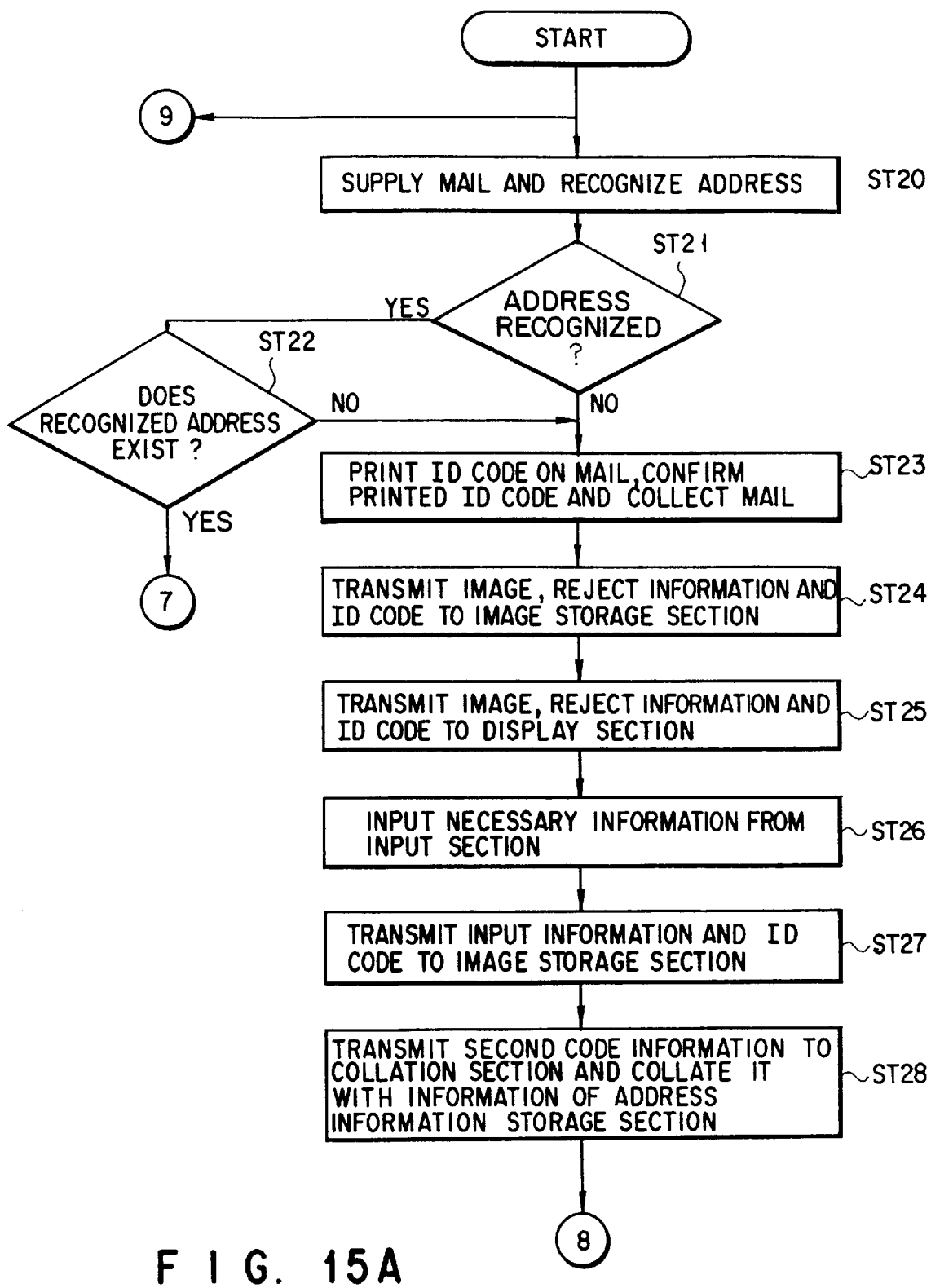
FIGS. 15A and 15B are views of a flowchart for explaining an operation of the mail processing system according to a third embodiment of the present invention.
Figure 15B:
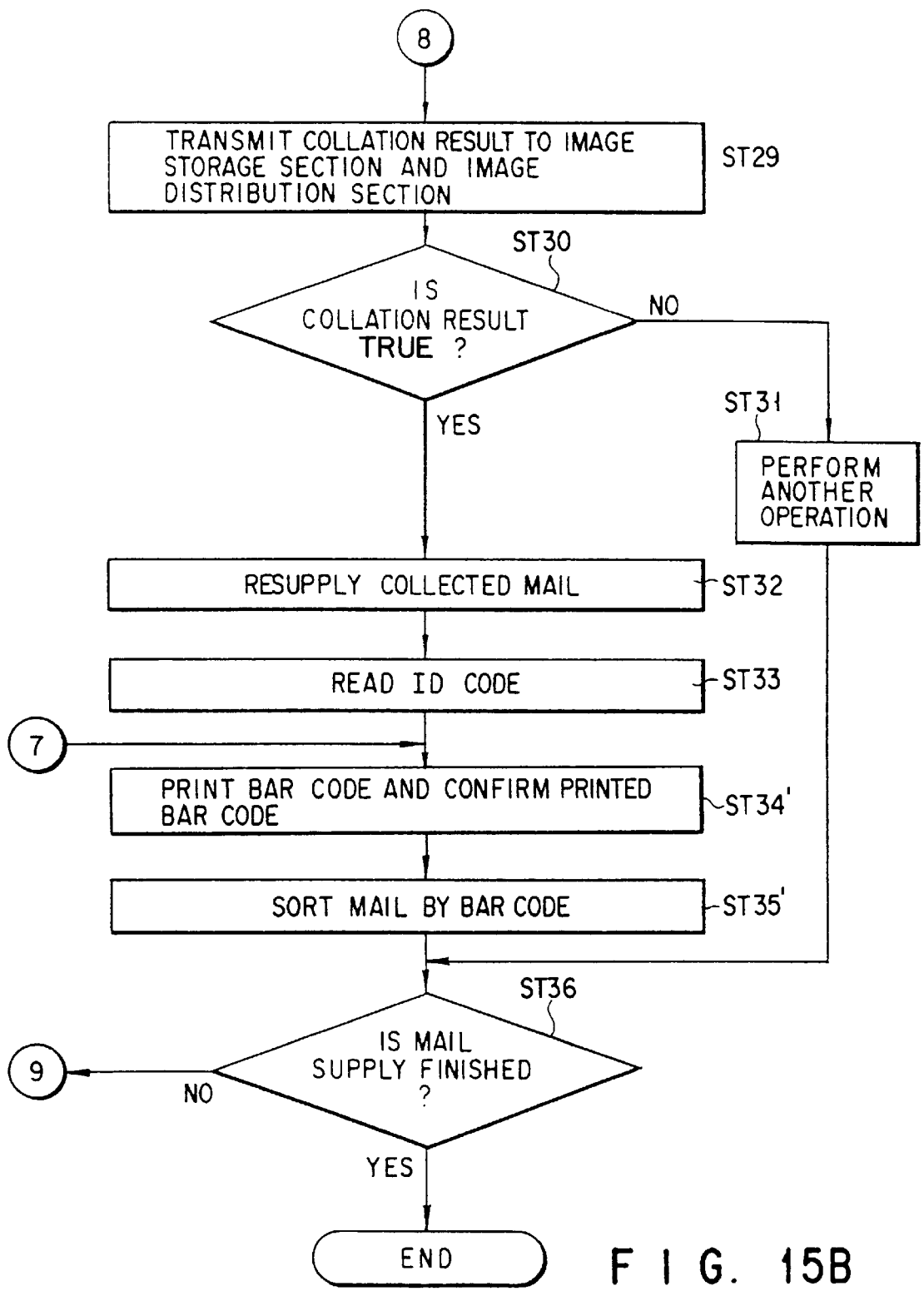

The bar code printer section 13 of the read/sort apparatus 3 is not provided with any bar code reader. It is however needless to say that the bar code printer section 13 can be provided with the bar code reader 13B of the first embodiment (shown in FIG. 1), and a mail processing operation in this case is shown as a third embodiment in the flowchart of FIGS. 15A and 15B. This flowchart differs from that of FIGS. 14A and 14B in steps 23', 34' and 35'. In step 23', after the mail P is printed with an ID code, the ID code is read and it is verified that the ID code is printed correctly or not. In step 34', after the mail P is printed with a bar code, the bar code is read and it is verified whether the bar code is printed correctly or not. In step 35', the sort section 14 sorts the mail P based on the read bar code. The above operation can be applied to the case where only the postal code number is input by the video coding system 4.

As described above, according to the embodiments of the present invention, if the address information of the mail is not recognized by the reading or recognition section, the mail is rejected and its address information is input by an operator. Since the control section 16 confirms whether there exists an address which is input by an operator using the address database, he or she can be prevented from causing an error in input. When a mail is rejected, an image of another mail having the same address form is displayed based on the reject information, thus improving input efficiency.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A mail processing system for processing mail with address information, comprising:

recognition means for recognizing the address information on the mail and providing recognized address information;

display means for displaying an image of mail whose address information is not recognized by said recognition means;

input means for inputting the address information of the mail based on the image of the mail displayed on said display means;

address storage means for storing addresses of an area;

collation means for collating the address information inputted by said input means with the addresses stored in said address storage means and providing a collation result; and address providing means for providing the address information inputted by said input means as a correct address of the mail whose address information is not recognized when the collation result provided by said collation means represents that the address information inputted coincides with the addresses stored in said address storage means.

2. The mail processing system according to claim 1, further comprising:

code providing means for providing a code to the mail based on the address information provided by said recognition means and said address providing means; and sort means for sorting the mail based on the code provided by said code providing means.

3. A mail processing system for processing mail with address information, comprising:

supply means for supplying mail;

recognition means for recognizing the address information on the mail supplied from said supply means and providing recognized address information;

a plurality of correction means for displaying an image of mail whose address information is not recognized by said recognition means and inputting the address information of the mail whose image is displayed;

transfer means for transferring the image of the mail whose address information is not recognized by said recognition means to a selected one of said plurality of correction means in accordance with partial recognition of the address information on the mail;

address storage means for storing addresses of an area;

collation means for collating the address information inputted by said plurality of correction means with the addresses stored in said address storage means and providing a collation result; and address providing means for providing the address information inputted by said plurality of correction means as a correct address of the mail whose address information is not recognized when the collation result provided by said collation means represents that the address information inputted coincides with the addresses stored in said address storage means.

4. The mail processing system according to claim 3, further comprising:

code providing means for providing a code to the mail based on the address information provided by said recognition means and said address providing means; and sort means for sorting the mail based on the code provided by said code providing means.

5. The mail processing system according to claim 4, wherein said partial recognition includes writing information of the address on the mail.

6. The mail processing system according to claim 5, wherein said transfer means has a table indicating a correlation between the writing information and said plurality of correction means, and transfers the mail to a specific one of said plurality of correction means based on the table.

7. A mail processing system for processing mail with address information, comprising:

supply means for supplying the mail;

recognition means for recognizing the address information of the mail supplied from said supply means and providing recognized address information;

ID information providing means for providing ID information to mail whose address information is not recognized by said recognition means;

collection means for collecting the mail provided with the ID information by said ID information providing means;

storage means for storing an image of the mail provided with the ID information while causing the image of the mail provided with the ID information to correspond to the ID information;

correction means for displaying the image of the mail stored in said storage means and inputting the address information of the mail displayed;

address storage means for storing addresses of an area;

collation means for collating the address information inputted by said correction means with the addresses stored in said address storage means and providing a collation result;

address providing means for providing the address information inputted by said correction means while causing the address information to correspond to the ID information when the collation result provided by said collation means represents that the address information inputted coincides with the addresses stored in said address storage means;

ID information read means for reading the ID information when the mail with the ID information is supplied again from said collection means using said supply means; and code providing means for providing an address corresponding to the ID information to the mail when the ID information read by said ID information read means coincides with the ID information provided by said address providing means.

8. The mail processing system according to claim 7, further comprising sort means for sorting the mail based on the code provided by said code providing means.

* * * * *